United States Patent
Oechslen et al.

(10) Patent No.: US 10,707,728 B2
(45) Date of Patent: Jul. 7, 2020

(54) DEVICE FOR SEALING OFF MULTIPLE GROOVES OF A STATOR OF AN ELECTRIC DRIVE MACHINE

(71) Applicant: Dr. Ing. h.c. F. Porsche Aktiengesellschaft, Stuttgart (DE)

(72) Inventors: Stefan Oechslen, Stuttgart (DE); Jan Nägelkrämer, Stuttgart (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 76 days.

(21) Appl. No.: 15/868,049

(22) Filed: Jan. 11, 2018

(65) Prior Publication Data
US 2018/0212493 A1    Jul. 26, 2018

(30) Foreign Application Priority Data

Jan. 20, 2017 (DE) .......................... 10 2017 101 094

(51) Int. Cl.
| | |
|---|---|
| *H02K 9/197* | (2006.01) |
| *H02K 3/487* | (2006.01) |
| *H02K 3/34* | (2006.01) |
| *H02K 3/24* | (2006.01) |

(52) U.S. Cl.
CPC ............ *H02K 9/197* (2013.01); *H02K 3/345* (2013.01); *H02K 3/487* (2013.01); *H02K 3/24* (2013.01); *H02K 2207/03* (2013.01)

(58) Field of Classification Search
CPC ...... H02K 2207/03; H02K 9/197; H02K 3/24; H02K 3/345; H02K 3/487

USPC .......................................................... 310/54
See application file for complete search history.

(56) References Cited

U.S. PATENT DOCUMENTS

| | | | |
|---|---|---|---|
| 7,975,370 | B2 | 7/2011 | Becherucci et al. |
| 8,110,958 | B2 | 2/2012 | Kalavsky et al. |
| 2003/0057797 | A1* | 3/2003 | Kaneko .................. H02K 1/146 |
| | | | 310/216.064 |
| 2005/0015429 | A1 | 1/2005 | Ashley et al. |
| 2007/0052317 | A1 | 3/2007 | Tanaka et al. |
| 2009/0015084 | A1 | 1/2009 | Kalaysky et al. |

(Continued)

FOREIGN PATENT DOCUMENTS

| | | |
|---|---|---|
| CN | 101243597 A | 8/2008 |
| CN | 202363995 U | 8/2012 |
| DE | 102005039884 A1 | 3/2007 |

(Continued)

OTHER PUBLICATIONS

German Searth Report for German Application No. 10 2017 101 094.7, with partial English translation, dated Dec. 6, 2017—8 Pages.

(Continued)

*Primary Examiner* — Alex W Mok
(74) *Attorney, Agent, or Firm* — RatnerPrestia

(57) ABSTRACT

A device for sealing off multiple grooves of a stator of an electric drive machine with respect to a rotor of the electric drive machine. The device includes a seal which is able to be inserted simultaneously into the multiple grooves, wherein the seal is designed as an electrical insulator. The seal is designed to seal off the grooves with respect to the rotor. Windings of an electrical coil are able to be arranged in the grooves. The seal is of integral or unipartite design.

10 Claims, 3 Drawing Sheets

(56) References Cited

U.S. PATENT DOCUMENTS

2009/0289520 A1  11/2009  Takeshita et al.
2012/0223605 A1* 9/2012  Bode .................. H02K 5/124
                                                310/86

FOREIGN PATENT DOCUMENTS

| DE | 202016004885 U1 | 8/2016 |
| EP | 1542336 A1 | 6/2005 |
| EP | 1372242 B1 | 7/2009 |
| EP | 1768230 B1 | 4/2013 |
| JP | 2004072899 A | 3/2004 |

OTHER PUBLICATIONS

Chinese Office Action for Chinese Application No. 201810035040.8, dated Jul. 2, 2019, 7 pages.

* cited by examiner

DEVICE FOR SEALING OFF MULTIPLE GROOVES OF A STATOR OF AN ELECTRIC DRIVE MACHINE

CROSS-REFERENCE TO RELATED APPLICATIONS

This application claims priority to German Patent Application No. DE 10 2017 101 094.7, filed Jan. 20, 2017, the content of such application being incorporated by reference herein in its entirety.

FIELD OF THE INVENTION

The present invention relates to a device for sealing off multiple grooves of a stator of an electric drive machine with respect to a rotor of the electric drive machine.

BACKGROUND OF THE INVENTION

In an electric drive machine, heat is produced by some components during operation. This heat is dissipated by means of a cooling liquid. The heat absorbed by the cooling liquid is released to the surroundings, as a result of which the cooling medium cools down again and can once more dissipate heat from the heat-producing components.

Electric drive machines have electrical coils with windings. The windings are arranged in grooves of a main body. The main body may also be referred to as a stator lamination pack. The windings often produce a large part of the heat and therefore have to be cooled particularly well. The windings are therefore often flowed around directly by a (cooling liquid, for example an oil, in order to achieve particularly good heat transfer from the windings to the cooling liquid. The grooves must then be sealed off with respect to the rotor chamber in order to prevent cooling liquid from exiting into the rotor chamber. Moreover, the main body has to be electrically insulated with respect to the windings in order to ensure the correct function of the electric drive machine.

Devices for electrically insulating the main body and for sealing off the grooves with respect to the stator are known from the prior art. EP 1 542 336 A1 U.S. Patent App. Pub. No. 20050151429, which are incorporated by reference herein in their entirety, discloses a paper insulation for the grooves and a sealing strip for closing off the grooves after the insertion of the windings. EP 1 768 230 B1/U.S. Patent App. Pub. No. 2007052317, which are incorporated by reference herein, and EP 1 372 242 B1 U.S. Pat. No. 7,975,370, which are incorporated by reference herein, disclose that the openings of the grooves are sealed off by means of plastic closures. The grooves are electrically insulated by plastic insulations.

SUMMARY OF THE INVENTION

Against this background, the present invention relates to a device for sealing off is the grooves, which simplifies the assembly of the electric drive machine. Furthermore, an electric drive machine having such a device and a motor vehicle having such an electric drive machine are intended to be created.

The device comprises a sealing means (e.g., a seal) which is able to be inserted simultaneously into the grooves. Consequently, multiple sealing means, of which in each case one is inserted into in each case one of the grooves, are not required. The term "insert" is understood here also to mean that the sealing means is cast in, injection-molded or pressed in. It is possible for windings of an electrical coil to be arranged in the grooves, said windings being required for operating the electric drive machine. The sealing means is designed as an electrical insulator. For example, the sealing means may consist of plastic or a fiber composite material. Glass fibers, for example, may be used as fibers. The sealing means is designed to seal off the grooves with respect to the rotor. "Sealing off" is understood here to mean that the cooling liquid which is used during the operation of the electric drive machine is retained by the sealing means. The sealing means is of integral or unipartite design.

The integral or unipartite formation of the sealing means has the advantage that the sealing means can be inserted into the grooves in one working step in order to seal off the grooves. The assembly is thus simplified since it is not necessary for each groove to be sealed off individually.

According to one embodiment of the invention, it is possible for the sealing means to be able to be connected to the grooves in a form-fitting manner. This is possible for example if the grooves have an opening region in which they have a smaller cross-sectional area than in the remaining region. Such a groove form may have a similar appearance to a bottle in the cross-sectional view. In this case, the opening region is the equivalent to the bottle neck with the smaller cross-sectional area. The form-fitting connection to the grooves further simplifies the assembly since no further connecting means or elements are required.

The form-fitting connection of the sealing means to the grooves is also advantageous since the load on the sealing means by externally acting forces is reduced. Consequently, a particularly favorable material may be used for the sealing means.

In addition to the form-fitting connection, it is also possible for the sealing means to be able to be connected to the grooves in a materially cohesive manner Said means may be bonded for example into the grooves. It is also possible for the sealing means to be pressed into the grooves. Both the materially cohesive connection and the pressing connection are advantageously able to prevent or hinder axial displacement of the sealing means.

According to one embodiment of the invention, it is possible for the sealing means to be able to be introduced into the grooves. This feature too simplifies the assembly of the electric drive machine considerably. It is particularly advantageous if the sealing means is able to be introduced into the grooves in a manner parallel to the longitudinal axes of the grooves.

It is also possible for the sealing means to be cast or molded into the grooves during the production of the electric drive machine.

According to one embodiment of the invention, the sealing means may be designed to cover the stator in each case only in an opening region of the grooves. Outside the opening region, the stator may in this case be electrically insulated from the windings by further elements composed of paper or plastic. The opening region may, for example, face the rotor and comprise an opening. Within the context of this description, "the opening region" is understood to mean a region which comprises the opening and which comprises less than one half of the entire surface of the respective groove.

According to one embodiment of time invention; the sealing means may be designed to completely cover the stator in the region of the grooves. The complete coverage results in electrical insulation of the stator from the windings being achieved.

According to one embodiment of the invention, the sealing means may have recesses for the windings. The windings may be inserted into said recesses and be electrically insulated from one another in the inserted state. It is in particular possible for precisely just one winding to be insertable into each of the recesses.

According to one embodiment of the invention, it is possible for the sealing means to have flow elements, for influencing a flow of a fluid inside the grooves, and/or retaining elements for the windings. The flow elements may influence for example the flow of the cooling liquid, with the result that the cooling of the windings is improved. The retaining elements for the windings allow the windings to be protected against mechanical loads better.

The electric drive machine comprises a device according to one embodiment of the invention, the stator, the rotor and multiple windings, which are arranged in the grooves, of an electrical conductor. The windings are electrically insulated from the stator by the sealing means. It is possible for the sealing means to insulate the stator from the windings only in the opening regions of the grooves, or for the sealing means to insulate the stator from the windings in the entire region of the grooves. The grooves are sealed off with respect to the rotor by the sealing means.

According to one embodiment of the invention, the electric drive machine may be designed as a canned motor.

BRIEF DESCRIPTION OF THE DRAWINGS

Further features and advantages of the present invention will become apparent from the following description of preferred exemplary embodiments with reference to the accompanying drawing. Here, the same reference signs are used for identical or similar components and for components with identical or similar functions. In the drawings.

DETAILED DESCRIPTION OF THE INVENTION

Figure 1:
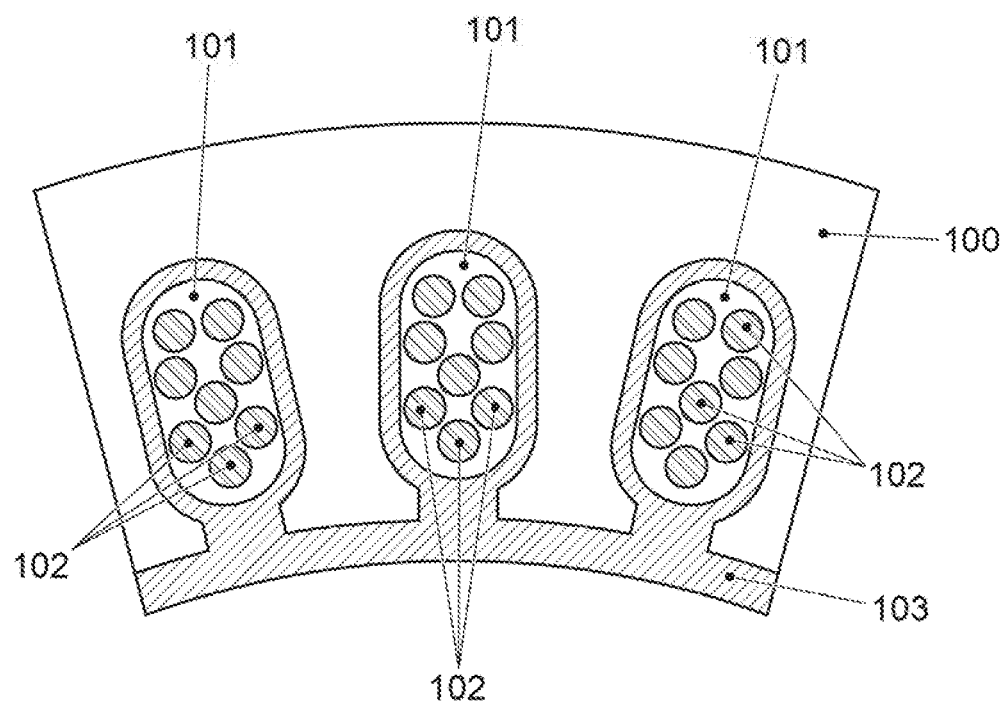
FIG. 1 shows a schematic sectional view of three grooves which are sealed off by a sealing means.

In FIG. 1, three grooves 101 introduced into a main body 100 are illustrated. Windings 102 of an electrical coil are arranged in the grooves 101. For reasons of clarity, only some of the windings 102 are provided with reference signs. Also illustrated is a unipartite sealing means 103, which seals off the grooves 101 and also electrically insulates the windings 102 from the main body 100. Thus, sealing-off of the grooves 101 and the electrical insulation of the main body 100 with respect to the windings 102 is achieved simultaneously by way of a single component, the sealing means 103.

The sealing means 103 can be fitted particularly easily by being inserted into the grooves 101 in a form-fitting manner. For example, the sealing means 103 may be introduced into the grooves 101 in a manner parallel to the longitudinal axis of the grooves 101. The sealing-off allows the windings 102 to be flowed around by a cooling liquid, with the result that reliable heat dissipation is achieved.

Figure 2:
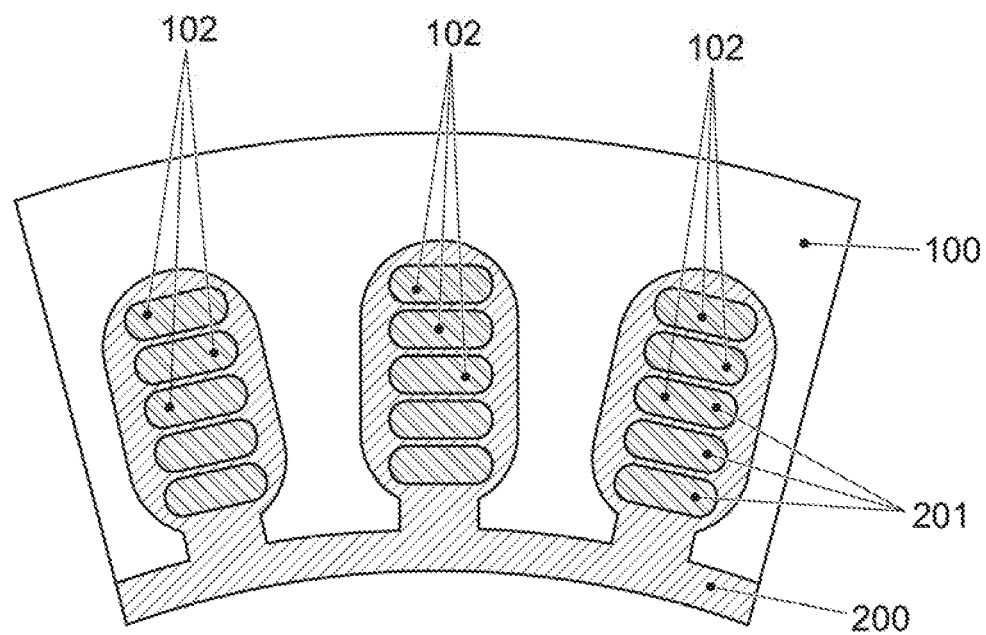
FIG. 2 shows a schematic sectional view of three grooves which are sealed off by a sealing means having recesses for the windings.

The sealing means 200 illustrated in FIG. 2 differs from the sealing means 103 from FIG. 1 inter alia in that recesses 201 are provided for the windings 102. The windings 102 are thus electrically insulated from one another by the sealing means 200, with the result that no coating of the windings 102 is required.

Figure 3:
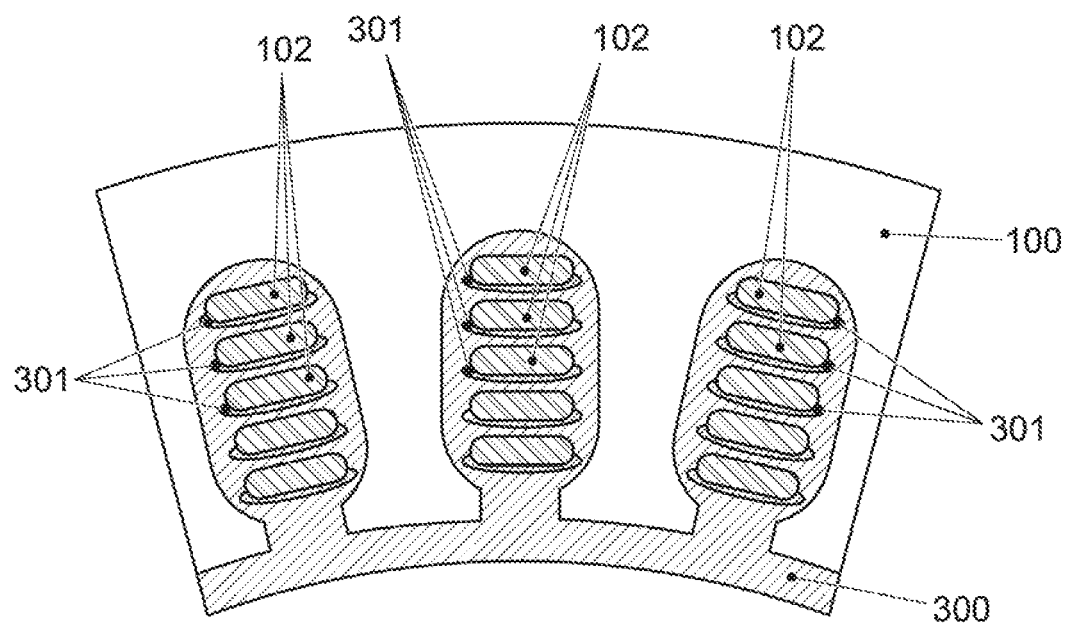
FIG. 3 shows a schematic sectional view of three grooves which are sealed off by a sealing means having recesses and flow elements.

The sealing means 300 illustrated in FIG. 3 differs from the sealing means 200 from FIG. 2 inter alia in that flow elements in the form of channels 301 are provided for the cooling liquid, wherein precisely each winding 102 is assigned precisely one channel 301 through which the cooling liquid which cools said respective winding 102 flows. Consequently, the heat transfer to the cooling liquid is improved by the sealing means 300.

Figure 4:
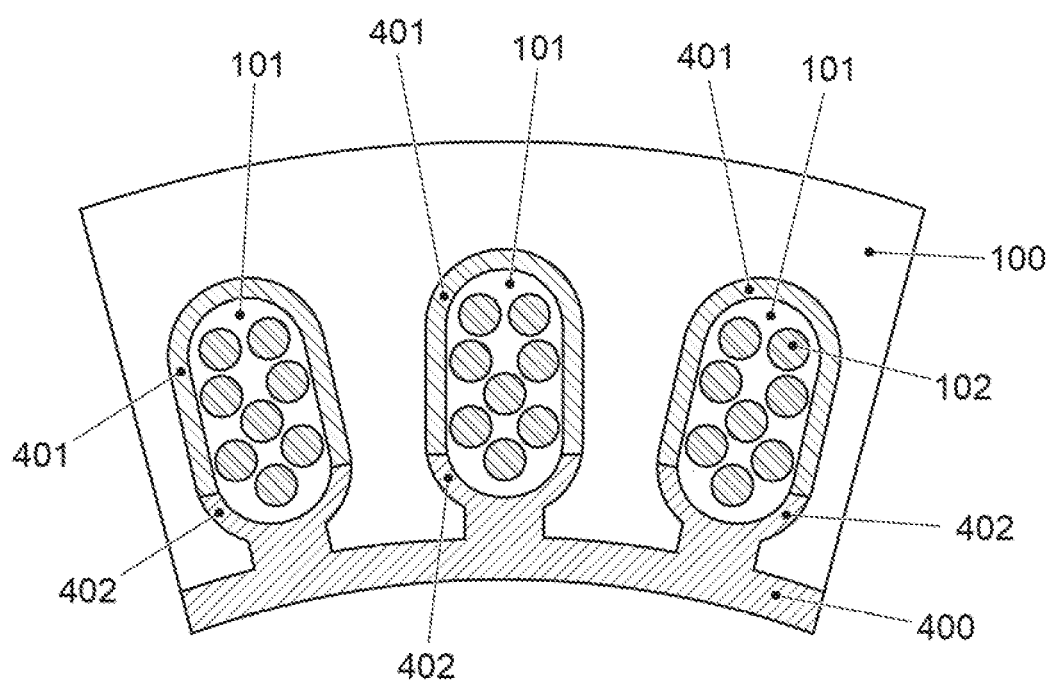
FIG. 4 shows a schematic sectional view of three grooves which are sealed off by a sealing means, wherein the sealing means covers only the opening region of the grooves.

The sealing means 400 illustrated in FIG. 4 differs from the sealing means 103 from FIG. 1 inter alia in that the sealing means 400 covers the main body 100 not in the complete region of the grooves 101, but only in an opening region 402. The opening region 402 comprises in this case the opening of the grooves 101 and extends over approximately one quarter of the surface of the grooves 101. The electrical insulation of the grooves 101 from the windings is in this case achieved by additional insulation means 401 which may be produced for example from paper or plastic. Also, the sealing means 400 is connected to the grooves 101 in a form-fitting manner.

What claimed is:

1. A device for sealing off multiple grooves of a stator of an electric drive machine and a rotor of the electric drive machine with respect to one another, the device comprising: a seal which is configured to be inserted simultaneously into the multiple grooves, wherein the seal is configured as an electrical insulator, and wherein the seal is configured to seal off the grooves and the rotor with respect to one another, wherein the seal includes multiple openings that are each sized to encapsulate windings of an electrical coil, wherein the openings are isolated from each other, wherein the seal is of integral or unipartite design, and wherein each opening is divided into recesses for accommodating the windings, wherein, for each opening, the windings in one recess are electrically insulated from the windings in another recess.

2. The device as claimed in claim 1, wherein the seal is configured to be connected to the grooves in a form-fitting manner.

3. The device as claimed in claim 1, wherein the seal is configured to be introduced into the grooves.

4. The device as claimed in claim 1, wherein the seal is configured to cover the stator in each case only in an opening region of the grooves.

5. The device as claimed in claim 1, wherein the seal is configured to completely cover the stator in a region of the grooves.

6. The device as claimed in claim 1, wherein the seal has flow elements for either influencing a flow of a fluid inside the grooves or retaining elements for the windings.

7. The electric drive machine of claim 1, comprising:
the stator, the rotor and the device,
wherein the windings are electrically insulated from the stator by the seal.

8. The electric drive machine as claimed in claim 7, wherein the electric drive machine is configured as a canned motor.

9. A motor vehicle, comprising the electric drive machine as claimed claim 7.

10. The device as claimed in claim 1, wherein the windings in one opening of the multiple openings are electrically insulated from the windings in another opening of the multiple openings.

* * * * *